No. 886,806. PATENTED MAY 5, 1908.
A. R. HOFFMANN.
SALT TROUGH.
APPLICATION FILED MAR. 4, 1907.
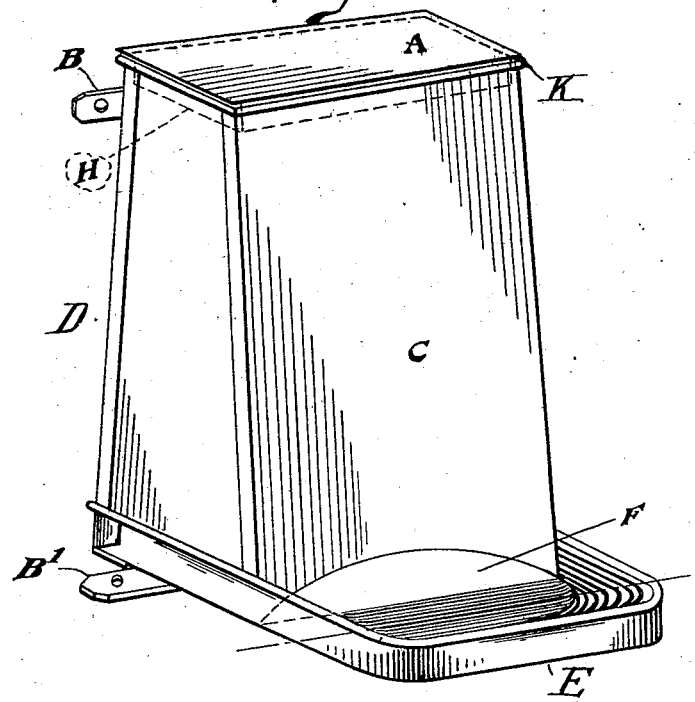
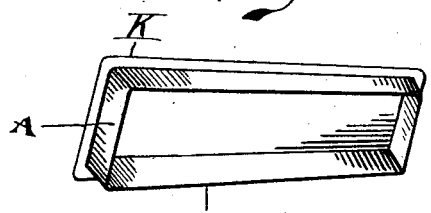
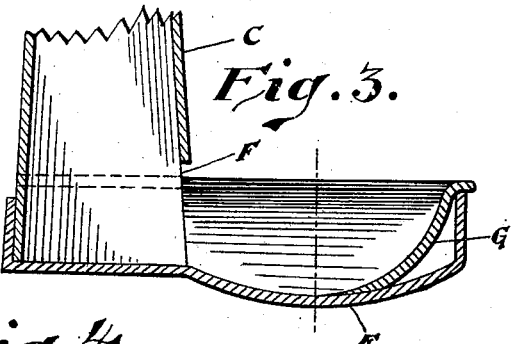
Witnesses:
Chas A Becker
Elliott R Goldsmith
Inventor:
August R Hoffmann
By P. A Griswold
his attorney.

UNITED STATES PATENT OFFICE.

AUGUST R. HOFFMANN, OF ST. LOUIS, MISSOURI.

SALT-TROUGH.

No. 886,806.      Specification of Letters Patent.      Patented May 5, 1908.

Application filed March 4, 1907. Serial No. 360,923.

*To all whom it may concern:*

Be it known that I, AUGUST R. HOFFMANN, a citizen of the United States, residing in the city of St. Louis, State of Missouri, have invented a new and useful Improvement in Salt-Troughs, of which the following is a full, clear, and exact specification, reference being had to the accompanying drawings, which form a part thereof.

My invention relates to that type of salt troughs wherein the salt is fed automatically as required from a box into a dish from which it is eaten.

The object of my invention is to afford a constant supply of salt and yet to prevent the too rapid consumption of the salt in large quantities or the waste of salt by its becoming foul because of being mixed with saliva or dirt or with both.

In troughs of this type much trouble has been experienced because of the salt absorbing moisture from the atmosphere and then on account of the shape of the box it becomes packed and does not feed into the dish, with the result that the trough becomes inoperative and ceases to accomplish its object. By my invention which is fully shown in the accompanying drawings, where similar letters are used to designate similar parts, I am able to overcome this difficulty and to attain the objects stated above.

Figure 1 is a perspective view of the trough ready for use; Fig. 2 is a perspective view of the under side or the inside of the cover of the box; Fig. 3 is a sectional view of the dish and the lower part of the box; and Fig. 4 is a view of one of the iron straps by means of which the trough is fastened in place.

Referring to the figures, D is a box into which a supply of salt is put; E is the dish from which the salt is eaten and into which it passes through the opening F, from the box D.

A is a cover for the box D. This cover is provided with a deep flange H and edges K projecting outside of the flange, as shown in Fig. 2, in order to make it close the box tightly so as to keep out not only dirt and dust, but as much moisture as possible.

B and B' are straps of iron which are fastened to the trough as shown, and by means of which the trough may be securely fastened in any desired position on a wall or post or shelf. The box D is made larger at the bottom than at the top so that the salt will not pack, as it will if the bottom is made the same size as the top or if the bottom is made smaller than the top. The front C of the box is made to slope outward from the top towards the bottom, so that at the bottom the box is deeper from front to back than at the top. The dish E is made rounded inside and without any corners or edges in which the salt may lodge and harden, and the bottom is made rounded as shown in the drawings, so that the salt tends to slide down towards the lowest part of the bottom from where it is taken by the animal. The inside of the dish E is preferably made rounded and smooth by the insertion of the filling G. The dish and the bottom of the box are preferably made in one piece as shown in the drawings, but this is not essential to the working of the trough. The dish is located at the bottom of the front of the box and projects outward from the front, as shown, and the rear part of the bottom of the dish is made to slope outwardly and downwardly away from the opening F as shown in Fig. 3, so that the salt will easily pass through F. from the box D into the dish E.

The operation of the trough is as follows: The trough is fastened by means of the straps B and B' in the desired position and then the top A is removed and a supply of salt free from lumps is put into the box D. Because of the outward slope of the front C the salt tends to accumulate at the bottom edge of the front and hence to pass out through the opening F into the dish E, from where it is eaten. After a certain amount of salt, depending upon the outward slope of the front of the box and the size of the opening F, has accumulated in the dish E, the salt will cease to pass through F and no more will pass out of the box until some of the salt in the dish has been eaten. The result is that there is always a supply of salt for animals in the dish and also a supply in the box which will be automatically fed into the dish as required.

The various parts of the trough may be made of such sizes as are necessary for the demands of the occasion, and any suitable material may be used for the various parts without departing from the spirit of my invention.

What I claim as new and desire to secure by Letters Patent is:

In a salt trough, the combination of a dish with a rounded bottom, a box having a front sloping outward from the top towards the bottom, said front having an opening at the lower edge through which salt may pass into the dish, the dish having a flat portion which constitutes the bottom of the box and a rounded portion which extends forwardly adjacent to the opening in the front of the box, a flanged top for the box, and means whereby the trough may be fastened in position, substantially as described.

In testimony whereof I have signed my name to this specification in the presence of two subscribing witnesses.

AUGUST R. HOFFMANN

Witnesses:
ADOLPH THIEL,
F. E. WINTERTON.